April 23, 1929.  J. W. HOOLEY  1,710,639
EXPANSION ANCHOR FOR BOLTS
Filed Sept. 17, 1927
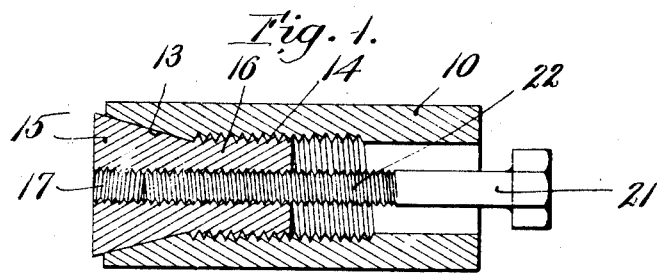
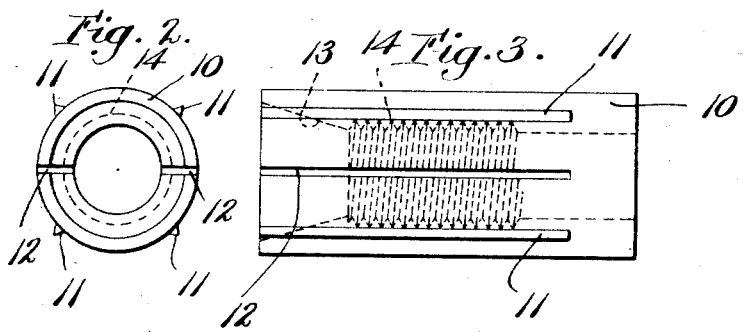
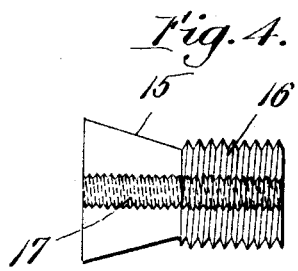
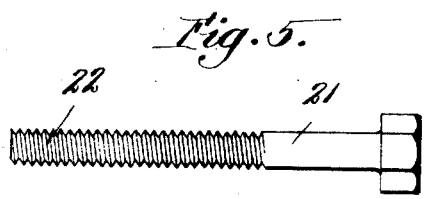
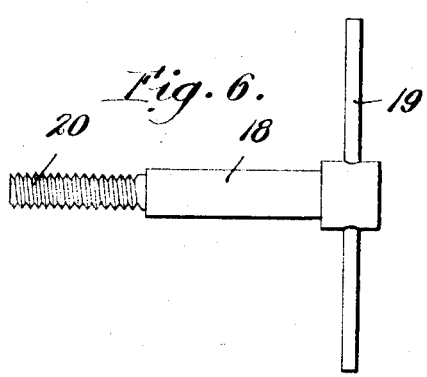
Inventor:
John W. Hooley
by A. W. Hanson
att'y.

Patented Apr. 23, 1929.

1,710,639

UNITED STATES PATENT OFFICE.

JOHN W. HOOLEY, OF LARCHMONT, NEW YORK.

EXPANSION ANCHOR FOR BOLTS.

Application filed September 17, 1927. Serial No. 220,131.

This invention relates to means for facilitating the secure mounting of bolts or the equivalents thereof in hard materials such as masonry or concrete work, and has particular reference to the structure of the shell of a bolt or screw-receiving anchor and a cooperating member to expand said shell and hold both the shell and the expanding member firmly in position ready to receive a bolt or screw at any time.

Heretofore, so far as I am aware, expansion shields or devices for enabling bolts to be mounted in holes in masonry or concrete work, depend upon the bolts themselves to effect and maintain the expansion members securely in the holes. Several objections exist to such structures. For instance, an article which is to be installed by means of the bolt may not be at hand, or may be of such thickness that its presence between the head of the bolt and the outer end of the anchor may be such as to prevent the bolt from being screwed in far enough to effect proper expansion of the anchor to interlock it with the interior of the masonry hole.

The principal object of my present invention is to provide devices of this general character which can be pre-set firmly in position before employment of a cooperating bolt, thereby avoiding any necessity of connecting an article with the bolt which is to hold it until any convenient time after the anchor has been securely fixed in position.

With the above mentioned object in view, my invention consists in the construction and combination of parts substantially as hereinafter described and claimed.

Of the accompanying drawings:

Figure 1 represents a longitudinal section of my improved anchor and with a bolt, in the relative positions which they occupy in use, but omitting any object or article supported or held by the bolt.

Figures 2 and 3 are, respectively, end and side elevations of the expansible shell or sleeve.

Figures 4 and 5 are side views respectively of the expanding plug and a bolt which may be mounted in position at any time.

Figure 6 is a side view of a suitable tool which may be temporarily employed for effecting the expansion operation.

Similar reference numerals indicate similar parts or features in all of the views.

The cylindrical sleeve or shell 10 is provided with external longitudinal ribs 11, and is slitted as at 12. At one end it is internally tapered, as at 13, and has internal left hand screw threads 14.

The plug member which effects expansion of the shell 10 is wedge-tapered at 15 corresponding with the tapered portion 13 of the shell, and is left-hand threaded at 16. Said plug member has an axial aperture which is right-hand threaded as at 17.

A suitable tool for temporary use is illustrated by Figure 6 and comprises a shank 18 having a handle 19 and right-hand threaded at 20.

In use, after a hole has been formed in the usual manner in the masonry or concrete, the shell 10, with the plug contained therein far enough to remain without effecting expansion of the shell, is inserted in said hole. Then the tool (Fig. 6) is screwed into the plug far enough to draw the portion 15 of the plug into the tapered portion 13 of the shell and expand the latter into firm connection with the wall of the masonry hole. Such operation of the tool rotates the plug, but the left-hand threads 14, 16, permit the plug to shift in the proper direction into the shell to effect expansion of the latter, said left-hand threads then maintaining the plug in the position to which it has been drawn during and after removal of the temporary tool, the sleeve or shell 10 remaining locked in the masonry hole ready to receive a bolt such as illustrated by Figure 5.

It will now be understood that since the bolt itself is not required to effect expansion, any member which is threaded to correspond with the internal threads 17 of the plug can be employed to connect an article or object with the anchor locked in the masonry hole, and such threaded member can be utilized at any time for its purpose, and can be screwed in any distance according to the article that is to be supported, without affecting in any way the relative positions of the expanded shell and its contained plug. And if for any reason it is desired to detach the supported article or object, removal of the bolt or equivalent screw will not cause any loosening of the hold which the anchor has in its masonry hole, said anchor remaining firmly in position to again receive the bolt.

I do not limit myself to a construction requiring the employment of such a tool as illustrated by Figure 6, to effect movement of the plug 15, 16, in the shell 10. For instance, the inner end of the threaded portion 16 may have a transverse slit or polygonal recess to be engaged by a screw driver or other suitably shaped tool to effect rotation of the plug to cause expansion of the shell.

Having now described my invention, I claim:

A device for holding a screw threaded member in a hole in hard material, said device comprising a one-piece longitudinally slitted expansible shell member having an internal tapered portion and a screw threaded portion, and a plug member having a wedge-shaped portion engaging said tapered portion and an outer threaded portion engaging and cooperating with said screw threaded portion of the shell member, said plug member having a longitudinal aperture threaded to be engaged by a setting tool and upon its removal by a bolt, the outer and inner threads of the plug member being in opposite directions.

In testimony whereof I have affixed my signature.

JOHN W. HOOLEY.